United States Patent
Rosa et al.

(10) Patent No.: US 10,619,020 B2
(45) Date of Patent: Apr. 14, 2020

(54) POLYETHYLENE FILMS WITH MATTE SURFACE

(71) Applicant: Dow Global Technologies LLC, Midland, MI (US)

(72) Inventors: Rosana Rosa, Sao Paulo (BR); Gianna Buaszczyk, Sao Paulo (BR); Nicolas C. Mazzola, Sao Paulo (BR); Jorge C. Gomes, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 140 days.

(21) Appl. No.: 15/740,621

(22) PCT Filed: May 13, 2016

(86) PCT No.: PCT/US2016/028780
§ 371 (c)(1),
(2) Date: Dec. 28, 2017

(87) PCT Pub. No.: WO2017/003543
PCT Pub. Date: Jan. 5, 2017

(65) Prior Publication Data
US 2018/0186947 A1 Jul. 5, 2018

Related U.S. Application Data

(60) Provisional application No. 62/186,777, filed on Jun. 30, 2015.

(51) Int. Cl.
| | |
|---|---|
| C08J 5/18 | (2006.01) |
| B32B 27/08 | (2006.01) |
| B32B 27/30 | (2006.01) |
| B32B 27/32 | (2006.01) |
| B32B 27/06 | (2006.01) |
| B32B 7/02 | (2019.01) |
| B32B 27/34 | (2006.01) |

(52) U.S. Cl.
CPC .................. *C08J 5/18* (2013.01); *B32B 7/02* (2013.01); *B32B 27/06* (2013.01); *B32B 27/08* (2013.01); *B32B 27/306* (2013.01); *B32B 27/308* (2013.01); *B32B 27/32* (2013.01); *B32B 27/327* (2013.01); *B32B 27/34* (2013.01); *B32B 2250/24* (2013.01); *B32B 2264/102* (2013.01); *B32B 2264/104* (2013.01); *B32B 2264/12* (2013.01); *B32B 2270/00* (2013.01); *B32B 2307/40* (2013.01); *B32B 2307/408* (2013.01); *B32B 2307/414* (2013.01); *B32B 2307/546* (2013.01); *B32B 2307/72* (2013.01); *B32B 2307/732* (2013.01); *B32B 2323/046* (2013.01); *B32B 2439/00* (2013.01); *B32B 2439/46* (2013.01); *B32B 2439/70* (2013.01); *C08J 2323/04* (2013.01); *C08J 2323/06* (2013.01)

(58) Field of Classification Search
CPC ..... C08L 23/06–0815; B32B 27/00–42; C08K 3/00–40
See application file for complete search history.

(56) References Cited

U.S. PATENT DOCUMENTS

| | | | |
|---|---|---|---|
| 3,224,997 A * | 12/1965 | Hunter | C08K 3/00 523/171 |
| 4,820,557 A | 4/1989 | Warren | |
| 4,996,096 A | 2/1991 | Dew | |
| 5,473,016 A | 12/1995 | Fujii et al. | |
| 5,492,757 A | 2/1996 | Schuhmann et al. | |
| 5,681,523 A * | 10/1997 | Cobler | C08J 5/18 264/565 |
| 6,087,015 A | 7/2000 | Cretekos et al. | |
| 6,322,894 B1 | 11/2001 | Harley et al. | |
| 6,355,733 B1 * | 3/2002 | Williams | C08L 23/04 525/191 |
| 6,534,153 B1 | 3/2003 | Chu et al. | |
| 6,703,141 B1 | 3/2004 | Lu et al. | |
| 7,820,276 B2 | 10/2010 | Sukigara et al. | |
| 8,637,607 B2 * | 1/2014 | Saraf | B32B 27/32 525/191 |
| 2002/0182391 A1 | 12/2002 | Migliorini et al. | |
| 2004/0023052 A1 | 2/2004 | Ambroise | |
| 2008/0032141 A1 | 2/2008 | Longmoore | |
| 2009/0081474 A1 | 3/2009 | Keung | |
| 2010/0119793 A1 * | 5/2010 | Desjardins | C08F 210/16 428/219 |
| 2011/0008603 A1 | 1/2011 | Ellingson | |
| 2011/0076463 A1 | 3/2011 | Sugimura | |
| 2011/0083796 A1 | 4/2011 | Sheppard et al. | |
| 2012/0100356 A1 | 4/2012 | Ohlsson et al. | |

(Continued)

FOREIGN PATENT DOCUMENTS

| | | |
|---|---|---|
| CA | 2438428 A | 3/2002 |
| CN | 1802255 A | 7/2006 |

(Continued)

OTHER PUBLICATIONS

International Search Report pertaining to PCT/US2016/028780 dated Aug. 3, 2016.

(Continued)

*Primary Examiner* — Prashant J Khatri
(74) *Attorney, Agent, or Firm* — Dinsmore & Shohl LLP

(57) ABSTRACT

Embodiments of monolayer and multilayer films which provide an improved matte surface are disclosed. The monolayer film or an outer layer of the multilayer films comprise greater than 50% by weight of a first polyethylene having a density of at least 0.935 g/cm³ and a melt index ($I_2$) of 0.9 g/10 minutes or less, and less than 50% by weight of a second polyethylene having a density less 0.935 g/cm³ and a melt index ($I_2$) of 20 g/10 minutes or less, wherein the film exhibits an external gloss of less than 20 units when measured at 45 according to ASTM D2457 and a haze greater than 60% when measured according to ASTM D1003.

18 Claims, No Drawings

(56) References Cited

U.S. PATENT DOCUMENTS

2012/0283390 A1\* 11/2012 Demirors ............... C08F 8/30
    525/194
2014/0016096 A1  1/2014 Iwase et al.

FOREIGN PATENT DOCUMENTS

| | | | |
|---|---|---|---|
| CN | 102009541 A | 4/2011 | |
| EP | 0844277 A1 \* | 5/1998 | ............... C08J 5/18 |
| GB | 1153597 A \* | 5/1969 | ............. C08L 23/06 |
| JP | 8081569 A | 3/1996 | |
| WO | WO9319714 | 10/1993 | |
| WO | WO0198409 A | 12/2001 | |
| WO | WO2014166339 A | 10/2014 | |
| WO | WO2017003543 A | 1/2017 | |

OTHER PUBLICATIONS

Written Opinion pertaining to US2016/028780 dated Aug. 3, 2016.
International Preliminary Report on Patentability to PCT/US2016/028780 dated Jan. 2, 2018.

\* cited by examiner

POLYETHYLENE FILMS WITH MATTE SURFACE

CROSS-REFERENCE TO RELATED APPLICATIONS

This application claims priority to U.S. Provisional Application Ser. No. 62/186,777, filed Jun. 30, 2015, the details of which are incorporated by reference herein.

FIELD

Embodiments of the present disclosure relate to polyethylene films with a matte surface, more particularly, polyethylene films having a matte surface and comprising a blend of compatible polyethylene components.

BACKGROUND

Polymer films having a matte surface are commonly used in a variety of applications. For example, packaging applications, such as pouches and bags for pet food, snack food, and the like, utilize polymer films having a matte surface. Optical properties, such as matte surface, may be defined in terms of surface gloss and haze. A matte surface may be characterized by lower gloss and higher haze values.

The matte surface is obtained through blends of incompatible polyolefins, generally by using blends of polyethylene and polypropylene. However, these incompatible blends of polyethylene and polypropylene create issues with process control. Specifically, when using different machine procedures for blending the incompatible polyolefins, the properties of the film product may be unpredictable and inconsistent.

Accordingly, there may be a continual need for improved polymer films which deliver a more consistent matte surface.

SUMMARY

Embodiments of the present invention are directed to films having a matte surface achieved by blending at least two compatible polyethylenes. By using compatible polyethylenes, these blends may deliver a more consistent matte surface regardless of mixing procedure.

According to one embodiment, a monolayer film is disclosed herein. The monolayer film comprises greater than 50% by weight of a first polyethylene having a density of at least 0.935 g/cm$^3$ and a melt index ($I_2$) of 0.9 g/10 minutes or less, and less than 50% by weight of a second polyethylene having a density less 0.935 g/cm$^3$ and a melt index ($I_2$) of 20 g/10 minutes or less. The film exhibits an external gloss of less than 20 units when measured at 45° according to ASTM D2457 and a haze greater than 60% when measured according to ASTM D1003. The melt index $I_2$ is measured according to ASTM D1238 at 190° C. and 2.16 kg load.

According to another embodiment, a multilayer film is also disclosed. The multilayer film comprises (a) a first outer layer comprising (i) greater than 50% by weight of the first outer layer of a first polyethylene having a density of at least 0.935 g/cm$^3$ and a melt index ($I_2$) of 0.9 g/10 minutes or less, and (ii) less than 50% by weight of the first outer layer of a second polyethylene having a density less 0.935 g/cm$^3$ and a melt index ($I_2$) of 20 g/10 minutes or less, and (b) at least one base layer comprising a polyolefin, wherein the film exhibits an external gloss of less than 20 units when measured at 45° according to ASTM D2457 and a haze greater than 60% when measured according to ASTM D1003.

Additional features and advantages of the embodiments described herein will be set forth in the detailed description which follows, and in part will be readily apparent to those skilled in the art from that description or recognized by practicing the embodiments described herein, including the detailed description which follows, and the claims.

DETAILED DESCRIPTION

Embodiments of the present disclosure are directed monolayer films or multilayer films having a matte surface. These films may be blown films incorporated into an article, such as a flexible package. In one or more embodiments, the monolayer films or outer layer of multilayer films comprise greater than 50% by weight of a first polyethylene having a density of at least 0.935 g/cm$^3$ and a melt index ($I_2$) of 0.9 g/10 minutes or less. The monolayer films or outer layer of multilayer films comprise less than 50% by weight of a second polyethylene having a density less 0.935 g/cm$^3$ and a melt index ($I_2$) of 20 g/10 minutes or less. The monolayer films or outer layer of the multilayer film exhibits a gloss of less than 20 units when measured at 45° according to ASTM D2457 and a haze greater than 60% when measured according to ASTM D1003. The melt index $I_2$ is measured according to ASTM D1238 at 190° C. and 2.16 kg load.

As used herein, "polyethylene" refers to a polymer made of 100% ethylene-monomer units, i.e., a homopolymer, or to copolymers produced with other monomeric moieties such as α-olefins, e.g. propylene, 1-butene, 1-pentene, 1-hexene or 1-octene, etc.

The monolayer film or the outer layer of a multilayer film comprises a polyethylene blend of at least two compatible polyethylenes, which are discussed herein as the "first polyethylene" and "second polyethylene." As used herein, the "polyethylene blend" includes the first polyethylene and the second polyethylene, and optionally, additional components or fillers, such as an additional polyethylene, an additional polyolefin, opacifiers, and combinations thereof. Various additional polyolefins are contemplated, for example, homopolymers or copolymers of $C_2$-$C_{12}$ monomers.

As stated above, the incompatibility of polypropylene with the polyethylene may cause processing inconsistencies when different mixing procedures are used. As such, the polyethylene blend may be free of polypropylene.

In addition to blending additional polyolefins with the first and second polyethylenes in the polyethylene blend, other additives such as opacifiers and inorganic fillers may also be included. As will be described below, the amount of opacifier may be minimized in some embodiments, because films with high amounts of opacifier may cause color change, especially when films are subjected to reverse printing processes. Thus, many of the embodiments discussed below regulate the amount of opacifier used in the polyethylene blend.

As stated above, the first polyethylene may have a density of at least 0.935 g/cm$^3$. Moreover, the first polyethylene may include a density of 0.935 g/cm$^3$ to about 0.975 g/cm$^3$, or 0.935 g/cm$^3$ to about 0.965 g/cm$^3$, or 0.935 g/cm$^3$ to about 0.960 g/cm$^3$, or 0.935 g/cm$^3$ to about 0.955 g/cm$^3$.

For example and not by way of limitation, the first polyethylene may include a high density polyethylene (HDPE), high density and high molecular weight polyethylene (HDPE-HMW), high density and ultrahigh molecular weight polyethylene (HDPE-UHMW), medium density polyethylene (MDPE). In further embodiments, the first polyethylene may include one or more of HDPE, MDPE, or combinations thereof. In a specific embodiment, the first polyethylene is MDPE.

The first polyethylene may be made using Ziegler-Natta catalysts or using metallocene, constrained geometry, or single cite catalysts. The first polyethylene may have a molecular weight distribution appropriate for the application. Various commercial embodiments are contemplated for the first polyethylene. For example, the first polyethylene may include DOW™ MDPE NG6995, or ELITE™ 5960G, which are both available from The Dow Chemical Company, Midland Mich. Additionally, another suitable commercial embodiment of the first polyethylene may be Braskem BF4810 produced by Braskem.

As stated above, the first polyethylene may also have a melt index ($I_2$) of 0.9 g/10 minutes or less when measured according to ASTM D1238 at 190° C. and 2.16 kg load. In further embodiments, the first polyethylene may have an $I_2$ value of about 0.001 g/10 minutes to 0.9 g/10 minutes, or about 0.01 g/10 minutes to 0.9 g/10 minutes, or about 0.03 g/10 minutes to about 0.5 g/10 minutes, or about or about 0.05 g/10 minutes to about 0.1 g/10.

Moreover, the first polyethylene may also have a melt index ($I_{10}$) of 12 g/10 minutes or less when measured according to ASTM D1238 at 190° C. and 10 kg load. In further embodiments, the first polyethylene may have an $I_{10}$ value of 1.2 g/10 minutes to 12 g/10 minutes, or 1.2 g/10 minutes to about 10 g/10 minutes, or 1.2 g/10 minutes to about 5 g/10 minutes, or 1.2 g/10 minutes to about 2 g/10 minutes.

Further, the first polyethylene may have a melt flow ratio ($I_{10}/I_2$) of at least 7, wherein $I_{10}/I_2$ is defined as the ratio of melt indices $I_{10}$ and $I_2$ measured at 10 kg and 2.16 kg, respectively, according to ASTM D1238. In further embodiments, the first polyethylene may have an $I_{10}/I_2$ value of 7 to about 50, or about 10 to about 40, or about 20 to about 35.

Additionally, various amounts of the first polyethylene are contemplated within the polyethylene blend. For example and not by way of limitation, the polyethylene may include greater than 50% by weight of the first polyethylene, or greater than 55% by weight of the first polyethylene, or greater than 60% by weight of the first polyethylene, or greater than 65% by weight of the first polyethylene. Moreover, the blend of first and second polyethylenes may include about 51% to about 90% by weight of the first polyethylene, or about 55% to about 80% by weight of the first polyethylene, or about 65% to about 75% by weight of the first polyethylene.

Like the first polyethylene, the second polyethylene may be made using Ziegler-Natta catalysts or using metallocene, constrained geometry, or single cite catalysts. The second polyethylene may have a density of less than 0.935 g/cm³. In additional embodiments, the second polyethylene may include a density of about 0.900 g/cm³ to 0.930 g/cm³, or about 0.910 g/cm³ to about 0.930 g/cm³, or about 0.915 g/cm³ to about 0.925 g/cm³.

For example and not by way of limitation, the second polyethylene may include low density polyethylene (LDPE), linear low density polyethylene (LLDPE), very low density polyethylene (VLDPE), and ultra low density polyethylene (ULDPE), or mixtures thereof. In a specific embodiment, the second polyethylene includes LLDPE. In one embodiment, the second polyethylene is a metallocene catalyzed polyethylene, for example, a metallocene catalyzed LLDPE.

Various commercial compositions are contemplated for the second polyethylene. For example, the second polyethylene may include DOWLEX® 2045 G which is available from The Dow Chemical Company, Midland Mich.

The second polyethylene may have a melt index ($I_2$) of 20 g/10 minutes or less when measured according to ASTM D1238 at 190° C. and 2.16 kg load. In further embodiments, the second polyethylene may comprise about 0.5 g/10 minutes to 20 g/10 minutes, or about 0.75 g/10 minutes to 10 g/10 minutes, or about 0.75 g/10 minutes to about 5 g/10 minutes, or about or about 0.75 g/10 minutes to about 2 g/10 minutes.

Further, the second polyethylene may have a melt index ($I_{10}$) of 150 g/10 minutes or less when measured according to ASTM D1238 at 190° C. and 10 kg load. In further embodiments, the second polyethylene may have an $I_{10}$ value of 5 g/10 minutes to 150 g/10 minutes, or 5 g/10 minutes to about 100 g/10 minutes, or 5 g/10 minutes to about 50 g/10 minutes, or 5 g/10 minutes to about 10 g/10 minutes.

Moreover, the second polyethylene may have a melt flow ratio ($I_{10}/I_2$) of at least 7. In further embodiments, the second polyethylene may have an $I_{10}/I_2$ value of 7 to 15, or 7 to about 12, or 7 to about 10.

Additionally, various amounts of the second polyethylene are contemplated within the polyethylene blend. For example and not by way of limitation, the polyethylene blend may include less than 50% by weight of the second polyethylene, or less than 45% by weight of the second polyethylene, or less than 40% by weight of the second polyethylene, or less than 35% by weight of the second polyethylene. Moreover, the polyethylene blend may include about 10% to about 49% by weight of the second polyethylene, or about 20% to about 40% by weight of the second polyethylene, or about 25% to about 35% by weight of the second polyethylene.

In the monolayer film or an outer layer of the multilayer film, the film may comprise at least about 80% by weight polyethylene, or at least about 90% by weight polyethylene. Stated another way, the total weight percent of the first polyethylene, the second polyethylene, and optionally any additional polyethylenes may be present in at least about 80% by weight, or at least about 90% by weight of the film. In further embodiments, the film may comprise less than 50% by weight of low density polyethylene, or less than 20% by weight of low density polyethylene.

In addition, the monolayer or multilayer films may include opacifier to make the films more opaque, which assists in the creation of the matte surface. Various inorganic fillers are considered suitable for use as an opacifier. In one or more embodiments, the opacifier may include talc, calcium carbonate, silicon dioxide, or combinations thereof.

The monolayer film or the outer layer of the multilayer film may include less than 30% by weight of an opacifier, or less than 20% by weight of the opacifier, or less than 10% by weight of an opacifier. In another embodiment, it is contemplated that the monolayer or outer layer of the multilayer film is substantially free of opacifier.

The first polyethylene, the second polyethylene, and the other optional ingredients are mixed by providing pellet dry mixes of the first polyethylene, the second polyethylene, and the other optional ingredients to an extruder. The extruder blends the first polyethylene, the second polyethylene, and the other optional ingredients. The extrusion may be provided directly into the film line production. Alternatively, the extrusion may be pelletized for subsequent film production. The polyethylene blends may be formed into films by blown film extrusion, or other processes, for example, molding processes.

In addition to the outer layers of the multilayer films described above, the multilayer film may include one or more additional layers. In many instances, the article or application may dictate number of layers to be used. In one embodiment, the multilayer film may have a thickness of about 15 to about 300 microns. Similarly, various layer structures are contemplated based on the article or application, which utilizes the multilayer film. For example, the multilayer film may include a plurality of layers, wherein each layer has polyethylene blends of the first polyethylene and the second polyethylene as described above. In this embodiment, it is contemplated that the plurality of polyethylene blend layers may be the same or varies in composition and weight ratio between respective layers.

In other embodiments, the multilayer films may have a hybrid structure wherein one or more of the core or base layers (i.e., non-outer layers) do not include the polyethylene blends of the first polyethylene and the second polyethylene described above. For example, the one or more base or core layers may include polyolefins, polyamides, ethylene vinyl alcohol, ethylene vinyl acetate, ethylene acrylic acid, ethylene maleic anhydride, or combinations thereof. In an exemplary embodiment, the multilayer films may include one base layer comprising one or more polyolefins, and a second base layer comprising a second polyolefin, a polyamide, ethylene vinyl alcohol, ethylene vinyl acetate, ethylene acrylic acid, ethylene maleic anhydride, or combinations thereof. Depending on the application, other components are contemplated for the internal layers (e.g., core or base layers), such as adhesives, tie layers, barrier layers, printings, or other components may be used.

In addition, the present monolayer or multilayer films may also be laminated or bonded to other substrates to provide different features needed for the flexible packages. For example and not by way of limitation, the present monolayer or multilayer films may be laminated to another polyethylene film for sealing. Moreover, the present monolayer or multilayer films may be coextruded with polyamide or ethylene vinyl alcohol (EVOH) to produce a barrier film.

The multilayer films may be produced by coextruding the multiple layers using machinery and processes known for multiple layer extrusions. In embodiments, the multilayer films are produced using a monolayer extrusion to achieve both film surfaces with a matte finish. In further embodiments, the multilayer films are produced using coextrusion to produce a multilayer film with both a glossy and a matte surface.

The matte surface properties of the monolayer films or multilayer films may be characterized by the properties of haze and gloss. As stated above, the films may exhibit an external gloss for external matte surfaces of the film of less than 20 units when measured at 45° according to ASTM D2457 and a haze greater than 60% when measured according to ASTM D1003. In further embodiments, the films may exhibit an external gloss of less than 12 units, of less than 10 units, or less than 8 units. Similarly, the films may also exhibit an internal gloss for internal matte surfaces of the film of less than 20 units when measured at 45° according to ASTM D2457.

Moreover, the films may exhibit a haze of greater than 65%, or greater than 70%. The haze may be for both the internal and external surfaces of the films, as the internal haze and external haze are substantially the same. That being said, some of the examples below only computed the external haze.

EXAMPLES

The following examples illustrate exemplary embodiments of the present monolayer and multilayer films in comparison to various comparative monolayer and multilayer films.

Example 1

The resins used in the Examples are listed in Table 1 below:

TABLE 1

Resins used for film structures

| Resin | Commercial Name | Type | $I_2$ (g/10 minutes) | $I_{10}$ (g/10 minutes) | $I_{10}/I_2$ | D (g/cm$^3$) |
|---|---|---|---|---|---|---|
| Resin 1 | MDPE NG6995 | MDPE | 0.06 | 1.51 | 25.2 | 0.939 |
| Resin 2 | Dowlex NG2045B | LLDPE | 1.00 | 8.06 | 8.0 | 0.920 |
| Resin 3 | Elite 5960G | mLLDPE | 0.85 | 9.8 | 11.5 | 0.965 |
| Resin 4 | Braskem BF4810 | HDPE | 0.05 | 1.60 | 32.0 | 0.948 |
| Resin 5 | Dowlex 2050B | HDPE | 0.95 | 7.06 | 7.4 | 0.950 |
| Resin 6 | Carrier MB | LLDPE | 20 | 146 | 7.3 | 0.924 |
| Opacifier agent | Talc | N/A | N/A | N/A | N/A | N/A |

Monolayer film structures, which include the resins of Table 1, are listed in Table 2 below. The 65 μm monolayer films were fabricated in a Carnevalli (Brazil) blown film extruder with internal bubble cooling (IBC). The resins were added and/or blended in the amounts listed in Table 2. The blown film extruder was equipped with an annular die with a diameter of 350 mm and a die gap of 2.1 mm. The blow up ratio (BUR) was 2.2:1 and the output rate was 200 kg/h.

TABLE 2

Monolayer film structures

| Film | Comments | Structure (65 μm thickness) |
|---|---|---|
| Composition 1 | Blend of compatible resins | 70% MDPE NG6995 + 30% Dowlex NG2045B |
| (Comparative) Composition 2 | Single HDPE resin | 100% BF4810 |

Optical properties (haze and gloss) were measured for the structures of Table 2, and the results are presented in Table 3 below. The haze was measured in accordance with ASTM D1003, and the gloss was measured in accordance with ASTM D2457. The results show that the polyethylene blend of Composition 1 has an external gloss 45° value for the matte surface lower than 12 units and an external haze value higher than 70%, whereas (Comparative) Composition 2 has an external haze value below 60%. Thus, Composition 1 has better matte surface properties than (Comparative) Composition 2.

TABLE 3

Monolayer film properties

| Film | External Gloss 45° | External Haze |
|---|---|---|
| Composition 1 | 7 | 72 |
| (Comparative) Composition 2 | 8 | 58 |

Example 2

Additional monolayer film structures are listed in Table 4 below. These monolayer film structures, which also include the resins of Table 1, were fabricated in a Collin (Germany) blown film extruder. The resins were blended in the amounts listed in Table 4 below at the listed thicknesses at an air temperature of 12° C. The blown film extruder was equipped with an annular die with a diameter of 60 mm and a die gap of 1.8 mm, and also included a mesh filter pack of 40/70 mesh upstream of the die. Moreover, the fabrication process utilized a BUR of 2.5:1.

TABLE 4

Monolayer film structures

| Film | Thickness (um) | Comments | Structure |
|---|---|---|---|
| (Comparative) Composition 3 | 15 | Single resin | 100% MDPE NG6995 |
| (Comparative) Composition 4 | 50 | Single resin | 100% Elite 5960G |
| Composition 5 | 55 | Blend of compatible resins | 70% MDPE NG6995 + 30% Dowlex NG2045B |

Gloss was measured for the monolayer film structures of Table 4 and the results are presented in Table 5 below. As shown, the polyethylene blend of Composition 5 has a lower external gloss for the matte surface than (Comparative) Compositions 3 and 4, which demonstrates improved matte finishing as compared to the single resins (Comparative) Compositions 3 and 4.

TABLE 5

Monolayer film properties

| Film | External Gloss 45° |
|---|---|
| (Comparative) Composition 3 | 12.0 |
| (Comparative) Composition 4 | 13.0 |
| Composition 5 | 7.7 |

Example 3

Multilayer film structures were produced and are listed in Table 6. The thickness of the multilayer films is 55 μm, with the layer distribution being 20/60/20 respectively for (Comparative) Composition 7. These multilayer film structures, which also include the resins of Table 1, were fabricated in a Collin (Germany) coextruder having multiple extruders therein. The individual resin layers were blended in separate extruders in the amounts listed in Table 6 below at the listed thicknesses at an air temperature of 12° C. To produce the five layers of the five-layer multilayer film structures below, five separate extruders having the following respective die diameters were utilized: 30 mm; 25 mm; 25 mm; 25 mm; and 30 mm. Then, the coextruder die combines the layers into the structures as listed below. The coextruder was equipped with an annular die with a diameter of 60 mm and a die gap of 1.8 mm, and also included a mesh filter pack of 40/70 mesh upstream of the die. Moreover, the fabrication process utilized a BUR of 2.5:1.

TABLE 6

Multilayer Film Structures

| Film | Structure | A (external) | B (core) | C (internal) |
|---|---|---|---|---|
| Composition 6 | A/A/A/A/A | 70% MDPE NG6995 + 30% Dowlex NG2045B | — | — |
| (Comparative) Composition 7 | A/B/B/B/C | 25% Dowlex 2050B + 55% Dowlex NG2045B + 10% Carrier MB + 10% opacifier agent | 70% 2050 + 30% 2045 | 70% 2045 + 30% 2050 |

Gloss was measured for the multilayer film structures of Table 6 and the results are presented in Table 7 below.

TABLE 7

Multilayer Film Properties

| Film | Gloss 45° (external) | Gloss 45° (internal) | Haze (external) | Haze (internal) |
|---|---|---|---|---|
| Composition 6 | 7.8 | 7.7 | 74.9 | 74.6 |
| (Comparative) Composition 7 | 13.0 | 45.5 | 58.2 | 58.0 |

As shown in Table 7, (Comparative) Composition 7, which includes greater than 50% by weight LLDPE (Dowlex NG2045B) with an $I_2$ of 1.0 g/10 minutes, had a higher gloss and lower haze than Composition 6. Comparing Composition 6 with (Comparative) Composition 7, it is clear that more than 50% of LLDPE with a melt index $I_2$>0.9 will increase gloss levels and reduce haze, thereby producing an inferior matte surface.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A film comprising:
    greater than 50% by weight of a first polyethylene having a density of at least 0.935 g/cm$^3$, a melt index ($I_2$) of 0.9 g/10 minutes or less, a melt index ($I_{10}$) of 1.2 g/10 minutes to 12 g/10 minutes, and a melt flow ratio ($I_{10}/I_2$) of 7 to 50; and
    less than 50% by weight of a second polyethylene having a density less 0.935 g/cm$^3$, a melt index ($I_2$) of 20 g/10 minutes or less, a melt index ($I_{10}$) of 5 g/10 minutes to 150 g/10 minutes, and a melt flow ratio ($I_{10}/I_2$) of 7 to 15; wherein the film is a monolayer film exhibiting an external gloss of less than 20 units when measured at 45° according to ASTM D2457 and an external haze greater than 60% when measured according to ASTM D1003;

the melt index ($I_2$) is measured according to ASTM D1238 at 190° C. and 2.16 kg load; and the melt index ($I_{10}$) is measured according to ASTM D1238 at 190° C. and 10 kg load.

2. The film of claim 1, wherein the film exhibits an external gloss of less than 12 units, a haze greater than 70%, or both.

3. The film according to claim 1, further comprising less than 50% by weight of an opacifier.

4. The film according to claim 1, wherein the film comprises less than 50% by weight of a low density polyethylene.

5. The film according to claim 1, wherein the first polyethylene is a medium density polyethylene.

6. The film according to claim 1, wherein the second polyethylene is a linear low density polyethylene.

7. The film according to claim 1, wherein the film is substantially free of polypropylene.

8. The film according to claim 1, wherein the film is comprised of at least 80% by weight polyethylene.

9. An article comprising the film of claim 1, wherein the article is a flexible package, and wherein the film has a thickness of about 15 to about 300 microns.

10. A film comprising:
(a) a first outer layer comprising (i) greater than 50% by weight of the first outer layer of a first polyethylene having a density of at least 0.935 g/cm³, a melt index ($I_2$) of 0.9 g/10 minutes or less, a melt index ($I_{10}$) of 1.2 g/10 minutes to 12 g/10 minutes, and a melt flow ratio ($I_{10}/I_2$) of 7 to 50, and (ii) less than 50% by weight of the first outer layer of a second polyethylene having a density less 0.935 g/cm³, a melt index ($I_2$) of 20 g/10 minutes or less, a melt index ($I_{10}$) of 5 g/10 minutes to 150 g/10 minutes, and a melt flow ratio ($I_{10}/I_2$) of 7 to 15; and (b) at least one base layer comprising a polyolefin; wherein the film is a monolayer film exhibiting an external gloss of less than 20 units when measured at 45° according to ASTM D2457 and an external haze greater than 60% when measured according to ASTM D1003;

the melt index ($I_2$) is measured according to ASTM D1238 at 190° C. and 2.16 kg load; and the melt index ($I_{10}$) is measured according to ASTM D1238 at 190° C. and 10 kg load.

11. The film of claim 10, wherein the film exhibits an external gloss of less than 12 units, a haze greater than 70%, or both.

12. The film of claim 10, wherein the first outer layer further comprises less than 50% by weight of an opacifier based on the weight of the first outer layer.

13. The film according to claim 10, wherein the first polyethylene is a medium density polyethylene.

14. The film according to claim 10, wherein the second polyethylene is a linear low density polyethylene.

15. The film according to claim 10, wherein the film is substantially free of polypropylene.

16. The film according to claim 10, wherein the first outer layer comprises at least 80% by weight polyethylene based on the weight of the first outer layer.

17. The film according to any of claim 10, further comprising a second base layer, wherein the second base layer comprises at least one of a second polyolefin, a polyimide, an ethylene vinyl alcohol (EVOH), ethylene vinyl acetate (EVA), ethylene acrylic acid, and ethylene maleic anhydride.

18. An article comprising the film of claim 10, wherein the article is a flexible package, and wherein the film has a thickness of about 15 to about 300 microns.

* * * * *